United States Patent [19]

Thompson

[11] Patent Number: 4,873,836
[45] Date of Patent: Oct. 17, 1989

[54] FLOW NOISE SUPPRESSION FOR ELECTRONIC VALVES

[75] Inventor: Michael B. Thompson, Hoffman Estates, Ill.

[73] Assignee: Eaton Corporation, Cleveland, Ohio

[21] Appl. No.: 202,638

[22] Filed: Jun. 6, 1988

[51] Int. Cl.[4] .............................................. F25B 41/04
[52] U.S. Cl. ........................................ 62/158; 62/222
[58] Field of Search ................. 62/158, 157, 231, 204, 62/205, 206, 210, 211, 212, 222, 223, 224, 225

[56] References Cited

U.S. PATENT DOCUMENTS

| | | | |
|---|---|---|---|
| 3,537,272 | 11/1970 | Hales et al. ............................ | 62/157 |
| 4,459,819 | 7/1984 | Hargraves ............................. | 62/212 |
| 4,499,739 | 2/1985 | Matsuoka et al. ................. | 62/158 X |
| 4,506,518 | 3/1985 | Yoshikawa et al. .................. | 62/180 |
| 4,523,435 | 6/1985 | Lord ..................................... | 62/212 |
| 4,548,047 | 10/1985 | Hayashi et al. ....................... | 62/160 |
| 4,571,951 | 2/1986 | Szymaszek ........................... | 62/212 |
| 4,677,830 | 7/1987 | Sumikawa et al. ............... | 62/225 X |
| 4,697,431 | 10/1987 | Alsenz ............................... | 62/157 X |
| 4,766,735 | 8/1988 | Gotou ............................... | 62/225 X |

*Primary Examiner*—Harry B. Tanner
*Attorney, Agent, or Firm*—R. A. Johnston

[57] ABSTRACT

A method for minimizing or eliminating the audible flow noise which accompanies the short initial period of compressor operation in an air-conditioning or refrigeration system which system utilizes an electrically-actuated expansion valve. The method is comprised of two steps used singly or in combination, said steps being (a) maintaining said valve in a closed or non-operative mode for a short period of time after the compressor is energized; and, (b) pulsing said valve at a higher-than-normal frequency for a short period of time commencing when the compressor is energized or shortly thereafter.

4 Claims, 2 Drawing Sheets

FLOW NOISE SUPPRESSION FOR ELECTRONIC VALVES

CROSS-REFERENCE TO RELATED APPLICATIONS

This application is related to Ser. No. 119,009, filed Nov. 12, 1987 "Indicating Refrigerant Saturation Point" in the name of R. J. Torrence; Ser. No. 119,943, filed Nov. 13, 1987 "Superheat Control of Air Conditioning System Incorporating Fuel Cooler" in the name of M. B. Thompson and R. J. Torrence; Ser. No. 168,041, filed Mar. 14, 1988 "Controlling Superheat in a Refrigeration System" in the name of R. J. Torrence; and Ser. No. 188,017, filed Apr. 29, 1988 "Modulated Electrically Operated Refrigerant Expansion Valve" in the name of R. J. Torrence.

BACKGROUND OF THE INVENTION

The present invention relates to expansion valves for controlling flow of refrigerant between the exothermic heat exchanger or condenser and the endothermic heat exchanger or evaporator in a refrigeration or air conditioning system. Valves of this type are employed for creating a sufficient pressure drop and expansion of the refrigerant prior to entry into the evaporator.

Refrigeration systems of this type typically consist of a compressor to compress the refrigerant vapors, a condenser to condense compressed refrigerant vapors to liquid, an expansion valve, and an evaporator in which low pressure refrigerant liquid is vaporized, in connection with which the medium surrounding the evaporator coils is cooled.

Various types of expansion valves are known in the prior art, including both mechanically-actuated and electrically-actuated valves. These types are described in U.S. Patent and Trademark Office Ser. No. 188,017, filed Apr. 29, 1988, the disclosures of which are hereby incorporated by reference.

Electrically-actuated expansion valves typically operate by pulsing refrigerant material through the valve at a pulse rate controlled by the frequency with which a certain member of the valve oscillates back and forth. One problem common to electrically-actuated refrigerant expansion valves is the creation of excessive noise at the expansion valve for a short period of time after the compressor is energized. This problem appears to be caused by the presence of vaporous refrigerant rather than liquid refrigerant at the inlet port of the expansion valve at the time of start up. These vapors cause audible flow noise when pulsed through the expansion valve at the normal working frequency of the expansion valve. This audible noise persists until the vaporous refrigerant is pulsed through the expansion valve and only liquid refrigerant is present at the inlet expansion valve orifice. The audible noise is also reduced as the compressor, after being energized, begins to build pressure in its outflow line, which increase in pressure causes vaporous refrigerant in the condenser to liquify and also pushes liquid refrigerant closer to the expansion valve inlet orifice.

Prior art does not deal with this excessive noise problem; the problem has simply been tolerated without resolution.

SUMMARY OF THE INVENTION

The present invention provides a method for minimizing or eliminating the audible flow noise which accompanies the short initial period of compressor operation. The present invention contemplates three basic procedures to achieve the desired result.

The first and preferred method requires the expansion valve to remain in a closed position for a short initial period of time, approximately one second, after the compressor is energized and to thereafter be pulsed at a relatively high frequency for a second short period of time, approximately two seconds. After this combined approximately three second period of time the expansion valve is returned to its normal working frequency. The normal working frequency is in the range of ¼ to ⅔ the high frequency pulse rate. It is believed that, pursuant to this method, the increase in pressure caused by the commencement of compressor operation during the initial one second interval will compress any vaporous refrigerant which is then present at or near the expansion valve inlet orifice and will also push liquid refrigerant closer to the expansion valve inlet orifice.

To the extent vaporous refrigerant remains at or near the expansion valve inlet orifice, the high frequency pulsing moves the refrigerant through the valve with much less audible noise than would occur if normal frequency pulsing were employed. After the approximately two seconds of high frequency pulsing, most or all of the vaporous refrigerant has been moved through the valve and the valve may be returned to its normal working frequency. High frequency pulsing is not continued beyond the time period necessary to move vaporous refrigerant through the valve due to the higher stresses such pulsing imposes on the valve.

The second method requires the expansion valve to remain in a closed position for a short initial period of time, approximately one second, after the compressor is energized. Thereafter, the expansion valve is pulsed at its normal working frequency. It is believed that, pursuant to this method, the increase in pressure caused by the commencement of compressor operation will compress any vaporous refrigerant which is then present at or near the expansion valve inlet orifice and will also push liquid refrigerant closer to the expansion valve inlet orifice.

Pursuant to the third method, high frequency pulsing is commenced immediately upon energization of the compressor, with no initial period of delay. High frequency pulsing is continued for approximately a three second period of time, after which the pulse rate is returned to its normal working frequency.

The advantages of the present invention over the prior art are that audible flow noises associated with the start up of an air-conditioning or refrigeration system are minimized or eliminated. This is particularly important with respect to passenger vehicle air-conditioning systems, where passenger comfort is a paramount concern. Elimination of noise enhances passenger comfort, and reduces the possibility that owners of vehicles will believe something is wrong with their car or air-conditioning system if they consistently hear a noise whenever they turn their air-conditioning system on.

DETAILED DESCRIPTION

Figure 1:
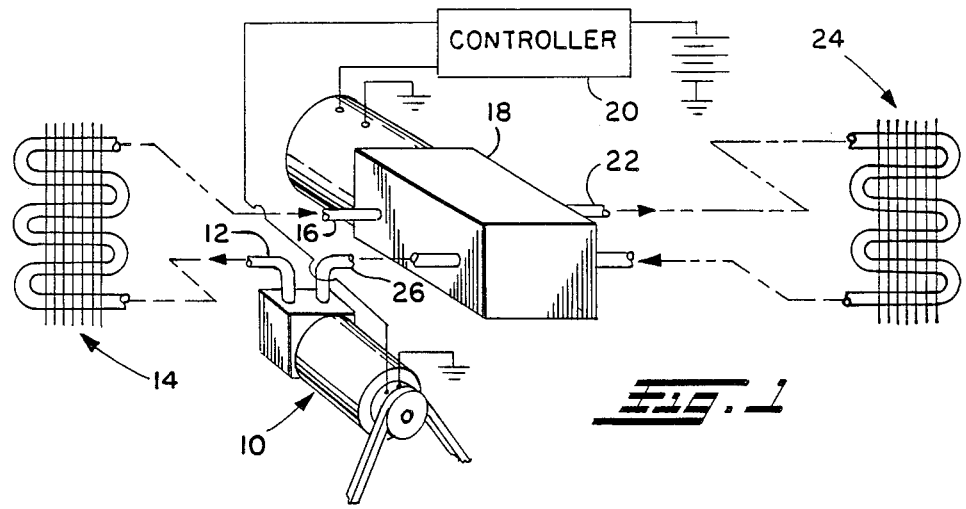
FIG. 1 is a partial schematic, partial perspective illustration of an air-conditioning or refrigeration system.

Referring to FIG. 1, the compressor is indicated generally at 10 and has an outflow tube 12 which is connected with and conveys pressurized refrigerant material to the condenser, indicated generally at 14. The condenser is connected by means of tubing to the expansion valve inlet port 16 which is connected to the expansion valve 18. The expansion valve inlet port 16 communicates with the expansion valve inlet orifice (not shown), which is connected by valving means to the expansion valve outlet port 22. The action of the expansion valve 18 and compressor 10 are controlled by the controller 20, by means of electronic signals sent between said controller and said valve and said compressor. The expansion valve outlet port 22 is connected by tubing means to the evaporator, indicated generally at 24. Said evaporator is connected by tubing means to the compressor inflow port 26; said tubing means may, but need not, pass through the expansion valve 18.

Figure 2:
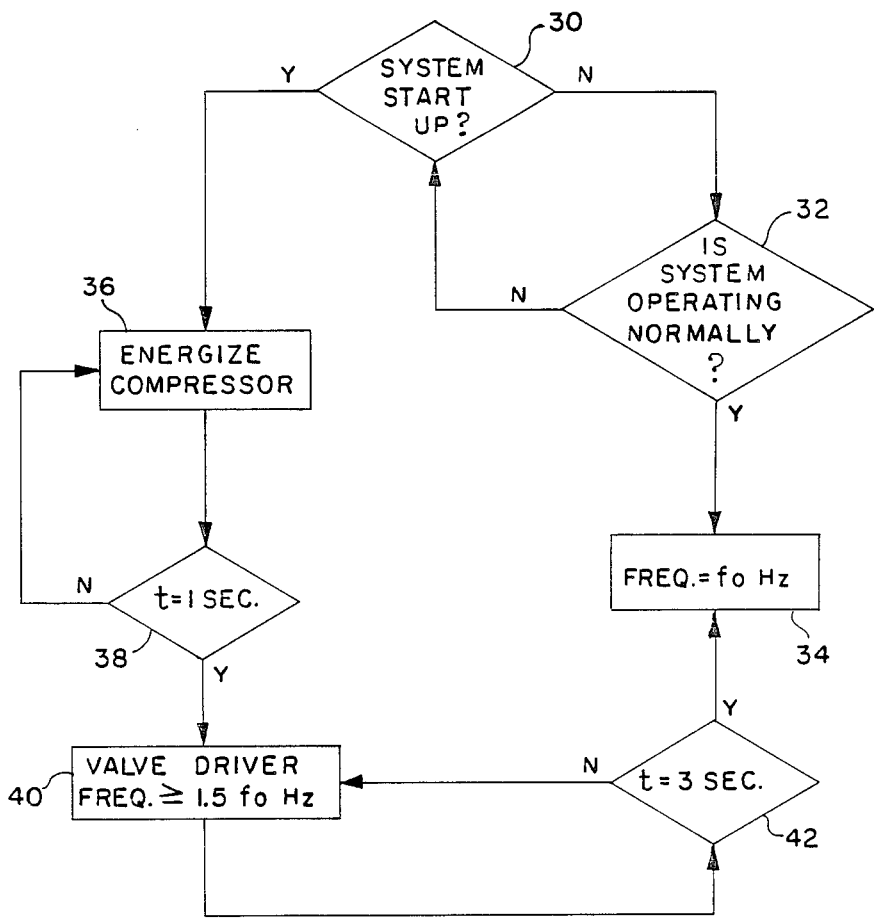
FIG. 2 is a flow chart of the preferred embodiment of the present invention.

FIG. 2 is a flow chart illustrating the preferred embodiment of the present invention. If the air-conditioning or refrigeration system is operating normally as denoted by reference numeral 32, the expansion valve is pulsed at its normal working frequency at step 34. If the system is being started up as a step 30, the compressor is energized at step 36 and the expansion valve remains in a closed or non-pulsing mode for an initial period of approximately one second at step 38. After the initial period of delay 38, the valve is pulsed at a high frequency rate equal to or greater than one and one-half times the normal working frequency at step 40. The high frequency pulsing is continued for approximately two seconds, or until approximately three seconds after the compressor was energized at step 42. After this period of high frequency pulsing, the valve pulse rate is reduced to its normal working frequency at step 34.

Figure 3:
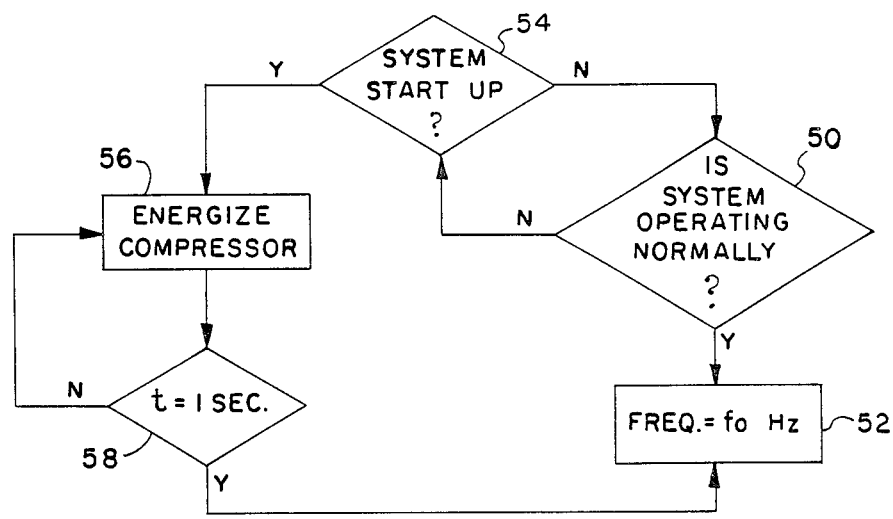
FIG. 3 is a flow chart of an alternative variation of the method described by the present invention; and, FIG. 4 is a flow chart of a second alternative variation of the method described by the present invention.

FIG. 3 is an alternative method of practicing the present invention. If the system is operating normally at step 50, the expansion valve is pulsed at its normal working frequency at step 52. If the system is being started up at step 54, the compressor is energized at step 56 and the expansion valve remains in a closed or non-pulsing mode for an initial period of approximately one second at step 58. After the initial period of delay 58, the valve begins pulsing at its normal working frequency 52 and continues at that rate thereafter.

Figure 4:
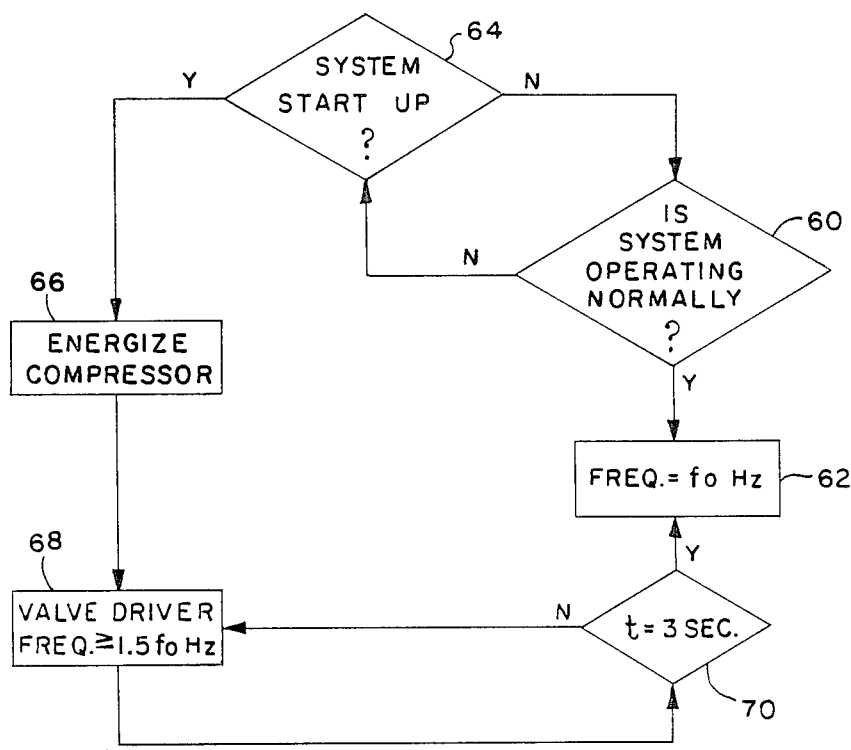

FIG. 4 is a second alternative method of practicing the present invention. If the system is operating normally at step 60, the expansion valve is pulsed at its normal working frequency at step 62. If the system is being started up at step 64, the compressor is energized at step 66 and the expansion valve begins, with no period of delay, to pulse at a high frequency rate equal to or greater than one and one-half times the normal working frequency at step 68. The high frequency pulsing is continued for approximately three seconds at step 70. After this period of high frequency pulsing, the valve pulse rate is reduced to its normal working frequency 62.

The present invention thus provides a method for minimizing or eliminating the audible flow noise which accompanies the short initial period of compressor operation by means of an initial period of delay and/or a short period of high frequency pulsing.

The present invention has been described in detail sufficient to enable one skilled in the art to practice same; however, it will be understood that the invention is capable of modification and variation therefrom, and is limited only by the following claims.

I claim:

1. A method of controlling refrigerant flow in a refrigeration system of the type having a compressor electrically energized for pumping refrigerant in a closed loop through an exothermic heat exchanger for condensing, through an electrically operated expansion valve for expansion and through an endothermic heat exchanger for cooling a compartment and returning to the compressor comprising the steps of:
    (a) initially energizing the compressor and pulsing said valve at a relatively high initial frequency;
    (b) maintaining said relatively high frequency pulsing for a predetermined time interval; and,
    (c) decreasing the frequency of said pulsing to a level less than two-thirds of said initial frequency.

2. The method defined in claim 1, wherein the step of maintaining comprises maintaining said relatively high frequency for about three seconds.

3. A method of controlling refrigerant flow in a refrigeration system of the type having a compressor electrically energized for pumping refrigerant in a closed loop through an exothermic heat exchanger for condensing, through an electrically operated expansion valve for expansion and through an endothermic heat exchanger for cooling a compartment and returning to the compressor comprising the steps of:
    (a) initially energizing the compressor;
    (b) maintaining the expansion valve in a closed position for a predetermined time interval; and,
    (c) thereafter pulsing said valve at a predetermined normal operating frequency.

4. The method defined in claim 3, wherein said step of maintaining said valve in a closed position for a predetermined time interval comprises the step of maintaining said valve in a closed position for one second.

* * * * *